United States Patent [19]
Byrne, Jr.

[11] Patent Number: 5,465,211

[45] Date of Patent: Nov. 7, 1995

[54] CONTROL SYSTEM FOR PROPELLER DRIVEN AIRCRAFT

[75] Inventor: William M. Byrne, Jr., Wichita, Kans.

[73] Assignee: Beech Aircraft Corporation, Wichita, Kans.

[21] Appl. No.: 236,296

[22] Filed: May 2, 1994

[51] Int. Cl.⁶ .......................... B63H 25/42; B63B 39/08
[52] U.S. Cl. .................. 364/424.06; 364/433; 244/178; 416/43
[58] Field of Search .............................. 364/424.06, 433, 364/434, 441, 459; 416/20 R, 27, 30, 35, 43; 318/584, 586; 244/17.13, 87, 175, 177, 178, 181

[56] References Cited

U.S. PATENT DOCUMENTS

| | | | |
|---|---|---|---|
| 4,371,936 | 2/1983 | Adams et al. | 364/434 |
| 4,564,908 | 1/1986 | Cleford et al. | 364/433 |
| 4,628,455 | 12/1986 | Skutecki | 364/434 |
| 4,928,241 | 5/1990 | Day | 364/424.01 |
| 4,992,713 | 2/1991 | McCollum et al. | 318/586 |
| 5,127,608 | 7/1992 | Farineau et al. | 244/178 |
| 5,170,969 | 12/1992 | Lin | 244/194 |
| 5,238,203 | 8/1993 | Skonieczny et al. | 244/17.13 |
| 5,284,418 | 2/1994 | Moriya | 364/431.01 |
| 5,299,417 | 4/1994 | Page et al. | 364/434 |
| 5,301,112 | 4/1994 | Gold et al. | 364/434 |

Primary Examiner—Kevin J. Teska
Assistant Examiner—Tan Q. Nguyen
Attorney, Agent, or Firm—William R. Clark

[57] ABSTRACT

A control system is provided which prevents a powerful, propeller driven, jet training aircraft from requiring corrective action to throttling and gyroscopic effects when the student wishes to fly the aircraft in coordinated flight. The control system includes a digital memory having stored therein flight test generated data representative of the relationship between the amount of rudder trim required to maintain the aircraft in coordinated flight as a function of aircraft engine torque and airspeed. Sensors are provided to measure aircraft engine torque aircraft altitude aircraft speed, and pitch rate. The measured parameters are coupled to the digital computer. The digital computer combines the parameters provided by the sensors and data read from the memory to produce a composite rudder trim signal which automatically reduces rudder forces induced by throttling and gyroscopic effects produced in response to pilot commanded maneuvers to thereby maintain the aircraft in coordinated flight. Thus, once the student trims the aircraft, the control system maintains the aircraft approximately trimmed throughout the flight envelope regardless of flight condition changes or acrobatic maneuver.

3 Claims, 2 Drawing Sheets

CONTROL SYSTEM FOR PROPELLER DRIVEN AIRCRAFT

BACKGROUND OF THE INVENTION

This invention relates generally to aircraft control systems and more particularly to aircraft control systems adapted for propeller driven aircraft used in the initial phase of jet pilot training.

As is known in the art, a jet pilot student typically begins the flight training process on a propeller driven aircraft. It is desirable that the propeller driven aircraft provide speed and power characteristics of a jet. Therefore, a powerful propeller aircraft, having power to weight and power to wing area ratios large compared to a typical single propeller driven aircraft, is typically used during the initial phase of the training process. However, with such a powerful propeller driven aircraft, changes in power, airspeed, or altitude have a pronounced effect on the rudder trim conditions required to maintain the aircraft in coordinated flight. More specifically: (1) When a single propeller aircraft is throttled, the rotational effect of the propeller produced "propwash" i.e., an airflow around the aircraft that swirls, or spirals, downstream to engage the tail section thereby producing lateral forces on the tail requiring a change in the rudder position in order to maintain coordinated flight; and, (2) Because of gyroscopic effects associated with the rotating engine mass (i.e., primarily the propeller), the aircraft precesses during aircraft pitch rate changes requiring pilot rudder movement to maintain coordinated flight. These pilot activity requirements are not characteristic of a jet aircraft. Therefore, these two effects (i.e., throttling and gyroscopic) effects are annoying to an inexperienced student pilot, as well as to the pilot's trainer, particularly in view of the extensive amount of power, airspeed and altitude change that occur during a typical training mission. Such effects are also annoying because of the additional rudder activity required by the student to accomplish acceptable acrobatic maneuvering during the training process. Therefore, requiring the student to counteract these effects in this phase of the training process has been considered, by some trainers, as "negative training" because they are not characteristic of a jet aircraft.

Reducing the throttling effect has been suggested by providing a trim aiding device that, based on flight test results, determines the rudder trim for a variety of power, airspeed and altitude conditions.

SUMMARY OF THE INVENTION

With this background of the invention in mind, it is therefore an object of this invention to provide an improved aircraft control system.

It is another object of the invention to provide a control system for a propeller driven aircraft used to train jet pilot students.

These and other objects of the invention are attained generally by providing a control system for a propeller driven aircraft used to train jet pilot students. The control system includes a digital computer having: a processor; and, a digital memory having stored therein flight test generated data representative of the relationship between the amount of rudder trim required to maintain the aircraft in coordinated flight as a function of aircraft airspeed, altitude, and engine torque. A sensor section is included for providing signals representative of the aircraft's actual engine torque, airspeed, altitude and pitch rate. The processor computes a composite control signal made up of: a throttling rudder trim component, $\delta_{THROTTLING}$, from data read from the memory in response to aircraft's indicated airspeed and engine torque and shifted in value an amount related to the aircraft's altitude; and, a gyroscopic rudder trim component, $\delta_{GYROSCOPIC}$, from the aircraft's indicated airspeed and pitch rate. The computed composite control signal represents the amount of rudder trim required to maintain the aircraft in coordinated flight. The composite signal is fed to a rudder trim actuator to automatically reduce rudder pedal forces induced by throttling and gyroscopic effects of the aircraft engine in response to pilot commanded maneuvers.

With such arrangement, a control system is provided which prevents a powerful, propeller driven, jet training aircraft from requiring excessive corrective action to throttling and gyroscopic effects when the student wishes to fly the aircraft in coordinated flight. Thus, once the student trims the aircraft, the control system maintains the aircraft approximately trimmed throughout the flight envelope regardless of flight condition changes or acrobatic maneuver. Further, this system allows the aircraft to be flown in uncoordinated flight, if the pilot so desires, without action being taken by the control system.

BRIEF DESCRIPTION OF THE DRAWINGS

The foregoing features and other features of the invention, as well as the invention itself, will become more apparent by reference to the following description taken together with the accompanying drawings, in which.

DESCRIPTION OF THE PREFERRED EMBODIMENT

Figure 1:
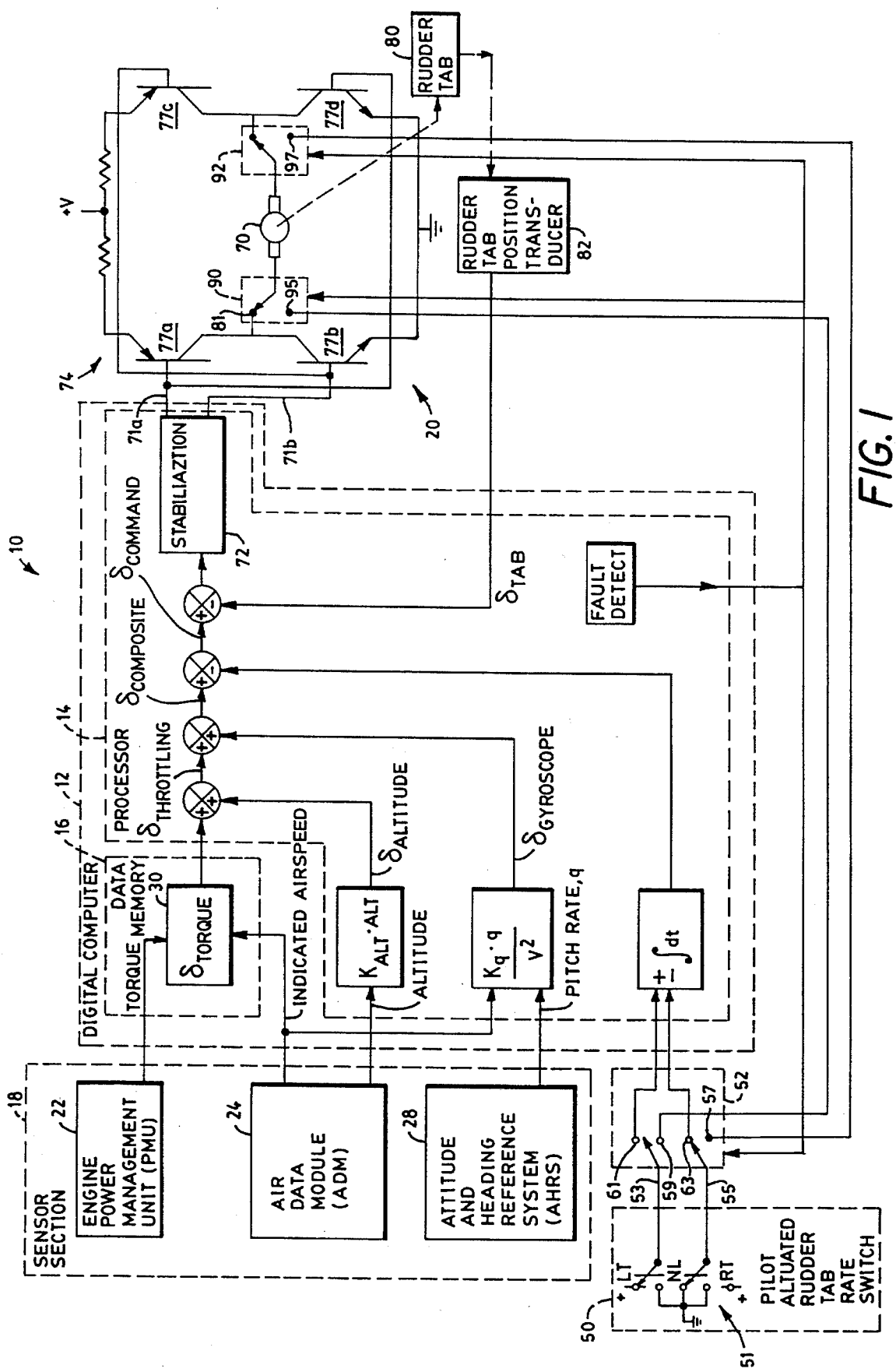
FIG. 1 is a block diagram of a control system according to the invention.

Referring now to FIG. 1, a control system 10 for a propeller driven aircraft used to train jet pilot students is shown. The control system 10 includes a digital computer 12 having a processor 14; and, a digital data memory 16. The digital memory 16 has stored therein flight test generated data representative of the relationship between the amount of rudder trim required to maintain the aircraft in coordinated flight as a function of aircraft airspeed and engine torque. A sensor section 18 is included for providing signals representative of the aircraft's actual engine torque, airspeed, altitude and pitch rate. The processor 14 computes a composite rudder trim control signal, $\delta_{COMPOSITE}$, made up of: a throttling rudder trim component, $\delta_{THROTTLING}$, from data read from the digital data memory 16 in response to aircraft's indicated airspeed and engine torque and shifted an amount related to the aircraft's altitude; and, a gyroscopic rudder trim component, $\delta_{GYROSCOPIC}$, from the aircraft's measured airspeed and pitch rate. The computed composite rudder trim control signal, $\delta_{COMPOSITE}$, represents the amount of rudder trim required to maintain the aircraft in coordinated flight. The composite rudder trim control signal, $\delta_{COMPOSITE}$, is fed to a rudder trim actuator 20 to properly deflect the rudder trim tab and thereby automatically reduce rudder forces induced by throttling and gyroscopic effects of the aircraft engine in response to pilot commanded maneuvers.

Figure 2:
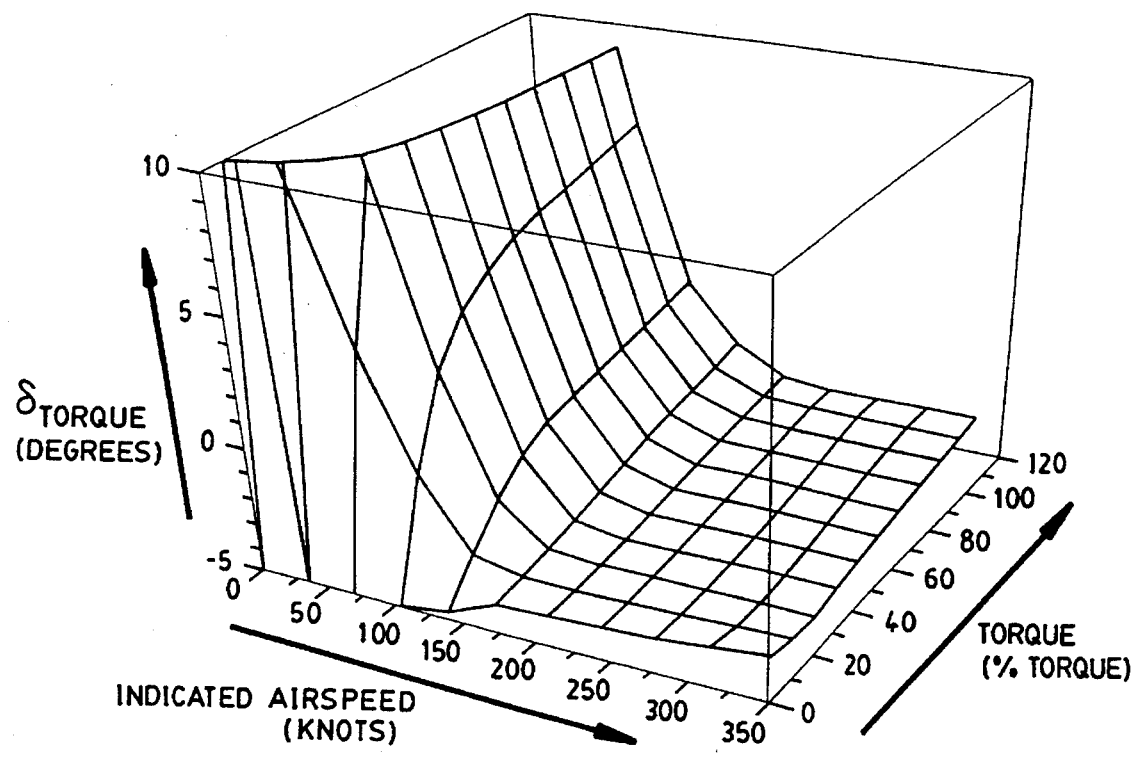
FIG. 2 is a graph showing the relationship between a throttling rudder trim component, $\delta_{THROTTLING}$, as a function of aircraft airspeed and aircraft engine torque, such relationship being stored as data in a digital data memory used in the control system of FIG. 1.

More particularly, digital data memory 16 stores the flight test generated data representative of the relationship between the amount of a torque/airspeed rudder trim component, $\delta_{TORQUE}$, (i.e., the amount of rudder trim required to maintain the aircraft in coordinated flight as a function of aircraft engine torque, and aircraft airspeed). Such data is shown in FIG. 2 for a Beechcraft PC-9 MK II aircraft. It is noted that the Beechcraft PC-9 MK II aircraft is a constant speed propeller aircraft. The sensor section 18 is provided to measure aircraft engine torque, aircraft altitude, aircraft airspeed, and pitch rate. The measured, or "indicated", aircraft engine torque, aircraft altitude and airspeed are coupled by the digital computer 12 to the digital data memory 16 to read from such digital data memory 16, the torque/airspeed rudder trim component, $\delta_{TORQUE}$. (It is first noted that the data is normalized by the maximum torque of the aircraft engine, here 2,889 ft.-lbs. for the Beechcraft PC-9 MK II. Thus, while the actual torque (in foot-pounds) is determined by the sensor section 18, it is normalized in the computer by the maximum torque, 2,889 ft.-lbs. to a "normalized torque" before looking up $\delta_{TORQUE}$ in the data memory 16.) The torque/airspeed rudder trim component, $\delta_{TORQUE}$, is translated in value, by the processor 14, an amount related to, here proportional to, the indicated aircraft altitude to produce the throttling rudder trim component, $\delta_{THROTTLING}$, i.e., $\delta_{THROTTLING}=K_{ALT}ALT$, where K is −0.000011 degrees per feet for the Beechcraft PC-9 MK II and ALT is aircraft altitude in feet. The processor 14 calculates the gyroscopic rudder trim component $\delta_{GYROSCOPIC}$, which is related to, here proportional to, the aircraft pitch rate, q, divided by the square of the indicated airspeed, V, i.e., $\delta_{GYROSCOPIC}=K_q q/V^2$, where $K_q$ for the Beechcraft PC-9 MK II is 2389 second knots$^2$. The processor 14 also algebraically adds the throttling rudder trim component, $\delta_{THROTTLING}$, to the gyroscopic rudder trim component, $\delta_{GYROSCOPIC}$, to produce the composite rudder trim control signal, $\delta_{COMPOSITE}$.

More particularly, the sensor section 18 includes an engine power management unit (PMU) 22, an air data module (ADM) 24, and an attitude and heading reference system (AHRS) 28. The PMU 22, ADM 24, and AHRS 28 are of conventional design. The PMU 22 provides an electrical signal representative of engine torque. The ADM 24 provides electrical signals representative of aircraft indicated air speed and altitude. The AHRS 28 provides an electrical signal representative of aircraft pitch rate. The torque signal produced by PMU 22 (after being normalized by the maximum torque, as described above) and the airspeed signal produced by ADM 24 are used to address a torque rudder trim ($\delta_{TORQUE}$) memory section 30 of the digital data memory 16. Such torque rudder trim ($\delta_{TORQUE}$) memory section 30 stores flight test generated data, $\delta_{TORQUE}$, representative of the relationship between the amount of rudder trim required to maintain the aircraft in coordinated flight as a function of aircraft engine normalized torque and aircraft speed. Thus, flight test generated $\delta_{TORQUE}$ data from the graph shown in FIG. 2, is stored for a finite number of normalized torque conditions and a finite number of airspeed conditions. That is, for each normalized torque condition, torque rudder trim ($\delta_{TORQUE}$) data is determined for each of the finite number of airspeed conditions. For such normalized torque condition, the $\delta_{TORQUE}$ data for each airspeed condition is stored at a corresponding column location in the memory section 30; the row location in such memory section 30 corresponding to the normalized torque condition used for the flight test generated data. The process is repeated for each of the remaining finite normalized torque conditions. Therefore, each row of memory section 30 stores $\delta_{TORQUE}$ data for a finite number of airspeed conditions at a normalized torque condition associated with such data. Likewise, each column of the torque rudder trim ($\delta_{TORQUE}$) memory section 30 stores $\delta_{TORQUE}$ data for a finite number of normalized torque conditions at an airspeed associated with such column. Thus, here the torque signal produced by the PMU 22 is used to address rows of the normalized torque rudder trim ($\delta_{TORQUE}$) memory section 30 and the airspeed signal produced by the ADM is used to address columns of such torque rudder trim ($\delta_{TORQUE}$) memory section 30. It should be understood that there are a finite number of data stored in the torque rudder trim ($\delta_{TORQUE}$) memory section 30. Thus, the processor 14 interpolates between data points in order to provide the torque rudder trim ($\delta_{TORQUE}$) data for the torque and airspeed measured by the sensor section 18.

The read torque rudder trim ($\delta_{TORQUE}$) data is modified, here translated or shifted, an amount, $\delta_{ALTITUDE}=K_{ALT}$, as described above, by the processor 14 to compensate for the aircraft altitude's. More specifically, a rudder trim adjustment proportional to altitude is calculated by processor 14, as described above, and is algebraically added to the torque rudder trim ($\delta_{TORQUE}$) data read from torque rudder trim ($\delta_{TORQUE}$) memory section 30 to provide a signal $\delta_{THROTTLING}=\delta_{ALTITUDE}+\delta_{TORQUE}$. The signal $\delta_{THROTTLING}$ represents the amount of rudder trim required to automatically reduce rudder forces produced by throttling, propwash, induced spiralling airflow changes around the body of the aircraft fuselage.

As noted above, the $\delta_{THROTTLING}$ signal is algebraically added to a the calculated gyroscopic trim component, $\delta_{GYROSCOPIC}$, to produce a composite rudder trim signal, $\delta_{COMPOSITE}$. The calculated gyroscopic trim component, $\delta_{GYROSCOPIC}$, is representative of the relationship between the amount of rudder trim required to maintain the aircraft in coordinated flight as a function of aircraft pitch rate. More particularly, the aircraft pitch rate signal produced by AHRS 28 is combined by the processor 14 with the measured airspeed measurement in accordance with: $K_q q/(V^2)$ where:

q is measured aircraft pitch rate ( degrees per second);

V is measured indicated airspeed (knots); and $K_q$ is a constant related to the product $\Omega I$, where ω is propeller speed (i.e, rotational rate, here a constant) and I is the propeller's rotational inertia (here $K_q$=2389 seconds knots$^2$ for Beechcraft PC-9 MK II).

The signal $\delta_{GYROSCOPIC}$ represents the amount of rudder trim required to properly deflect the rudder, more particularly the rudder tab, and thereby automatically reduce rudder forces induced by gyroscopic effects of the aircraft engine in responding to pilot commanded maneuvers.

Superimposed on the composite rudder trim signal, $\delta_{COMPOSITE}$, is the time integration of the pilot, manually generated, rudder trim commands. More particularly, the electrical signal produced by the pilot's finger actuated, trim tab control 50 is fed to a switch 52, as shown. The trim tab control 50 includes the conventional left-right-neutral pilot activated trim tab rate switch 51 which the pilot flips from a neutral position in order to command the trim tab to move to the right or to the left. The trim tab control 50 is of conventional design and has a pair of output lines, 53, 55, as shown. If the pilot commands a right (RT) movement of the trim tab rate switch 51 produces a positive potential on line 53 and a ground potential on line 55 (as indicated in FIG. 1). If the pilot commands a left (LT) movement of the trim tab rate switch 51 produces a ground potential on line 53 and a positive potential on line 55. If the pilot wishes to leave the rudder tab in its current position the trim tab rate switch 51 is not flipped (i.e., is placed ion a neutral (NL) position) and lines 53 and 55 are both at ground potential.

In the absence of a fault condition sensed by the computer 12 (i.e., a clock fault, a power failure, etc.), the output of the trim tab control 50 is electrically decoupled from output terminals 57, 59 of switch 52 and is electrically coupled to output terminals 61, 63 of switch 52, as shown. The control voltages on lines 53, 55 produced by trim tab control 50 in response to the pilot is integrated by the processor 14. More particularly, here if the pilot commands a left (LT) movement of the rudder tab the positive potential on line 53 is integrated in a "positive" (+) sense while, on the other hand, if the pilot commands a right (RT) movement of the rudder tab the positive potential on line 55 is integrated in a "negative" (−) sense. The integrated signal is then algebraically added to $\delta_{COMPOSITE}$ by processor 14 to produce a rudder trim command signal, $\delta_{COMMAND}$ in degrees, for the rudder trim actuator 20, as shown. The processor 14 process the rudder trim command signal, $\delta_{COMMAND}$, in an conventional manner to produce a digital control signal for a dc motor 70. In the absence of a detected fault, terminal 81 of switch 90 and terminal 83 of switch 92 are electrically connected to the pair of armatures of the motor 70, as shown. Thus, in such no fault condition, the processing provided to the rudder trim command signal, $\delta_{COMMAND}$, is a conventional stabilization function, (i.e., lead-lag filtering) functionally represented by the stabilization section 72 in FIG. 1. The stabilization signal calculated by the processor 14 is here logic signals used to switch transistors, in a conventional bridge network 74 to thereby control the direction of current through the armature of the dc motor 70. More particularly, the stabilization signal calculated by the processor 14 is here a pair of logic signals used to control four switching transistors 77a, 77b, 77c and 77d included in the dc motor bridge network 74 and in circuit with the armature of the dc motor 70, as shown. Thus, when the motor 70 is to drive the rudder tab 80 to the right, here transistors 77a, 77d are turned "on" by a logic 1 level signal on line 71a and transistors 77b, 77c are turned "off" by a logic 0 signal on line 71b; when the motor 70 is to drive the rudder tab 80 to the left, transistors 77a, 77b are turned "off" by the logic 0 signal on line 71a and transistors 77i c, 77d are turned "on" by the logic 1 level signal on line 71b; and when the position of the rudder tab 80 is not to change the transistors 77a, 77b, 77c, 77d are turned "off" by the logic 0 level signal on lines 71a and 71b. The time duration, or "pulse width" of the logic signal is determined by the stabilization function provided by the processor 14 represented by the stabilization section 72. The actual position of the rudder tab 80 is sensed in a conventional manner by a position transducer 82, and the produced positional signal is converted into a corresponding digital signal for the processor 14 thus providing a conventional feedback control function, as shown.

In the presence of a detected processor fault, the digital computer 12 is, in effect, prevented from providing control to the dc motor 70. That is, upon detection of a computer fault, the left-right-neutral pilot trim tab rate switch 51 in the trim tab control 50 and the logic signals from stabilization section 72 are decoupled from the computer and the motor 70 via switches 52, 90, 92. In such fault detected condition, lines 53, 55 are coupled to the armature of motor 70 via terminals 57, 59 of switch 52, and terminals 95, 97 of switch 92. Note that if a left (LT) movement is commanded, terminal 95 is at a positive potential relative to terminal 97, if a right (RT) movement is commanded, terminal 97 is at a positive potential relative to terminal 95, and if the trim tab rate switch 51 is in a neutral (NL) position terminals 95, 97 are at the same potential.

With the arrangement described above, a control system is provided which prevents a powerful, propeller driven, jet training aircraft from requiring corrective action to throttling and gyroscopic effects when the student wishes to fly the aircraft in coordinated flight. Thus, once the student trims the aircraft, the control system maintains the aircraft approximately trimmed throughout the flight envelope regardless of flight condition changes or acrobatic maneuver.

Having described a preferred embodiment of the invention, other embodiments incorporating its concepts will now be readily apparent to one of skill in the art. It is felt, therefore, that the invention should not be restricted to the disclosed embodiment, but, rather, should be limited only by the spirit and scope of the appended claims.

What is claimed is:

1. A control system for controlling a rudder in a propeller driven aircraft, comprising:

a digital memory having prestored data representative of the rudder trim required to maintain the aircraft in coordinated flight as a function of torque and airspeed;

a pitch rate sensor means for producing an electrical signal representative of the actual pitch rate of the aircraft;

a rudder trim actuator for actuating;

computer means for reading rudder trim data from the digital memory in response to actual torque and airspeed of the aircraft and for modifying such read data in accordance with the electrical signal produced by the pitch rate sensor means to provide a control signal; and said rudder trim actuator being responsive to said control signal to automatically reduce rudder pedal forces induced by throttling and gyroscopic effects of the aircraft engine responding to pilot commanded inputs affecting torque and airspeed.

2. The control system recited in claim 1 wherein the digital memory stores data representative of rudder trim required to maintain the aircraft in coordinated flight as a function of aircraft throttling induced airflow changes around the body of the aircraft fuselage; and wherein the control system includes sensor means for detecting aircraft throttling; and wherein the digital computer reads data from the digital memory in response to the detected aircraft throttling.

3. A control system for controlling a rudder in a propeller driven aircraft, comprising:

a digital memory for storing data representative of the relationship between rudder trim required to maintain the aircraft in coordinated flight and aircraft engine torque and aircraft speed;

a sensor section means, for producing electrical signals representative of the aircraft's airspeed, engine torque, altitude and pitch rate;

a rudder trim actuator coupled to said rudder; and computer means, responsive to the electrical signals, for reading rudder trim data from the digital memory as a function of aircraft airspeed and engine torque, and for modifying the read data in accordance with the electrical signals representative of the aircraft's altitude and pitch rate to produce a composite signal for the rudder trim actuator to control the rudder to automatically reduce rudder forces induced by throttling and gyroscopic effects of the aircraft engine when responding to pilot commanded maneuvers.

\* \* \* \* \*